United States Statutory Invention Registration [19]

[11] Reg. Number: H72

Wise et al. [45] Published: Jun. 3, 1986

[54] ORGANIC SUBSTITUTES FOR CHARCOAL IN BLACK POWDER

[75] Inventors: Sean Wise; Ronald A. Sasse, both of Abingdon, Md.

[73] Assignee: The United States of America as represented by the Secretary of the Army, Washington, D.C.

[21] Appl. No.: 573,097

[22] Filed: Jan. 23, 1984

[51] Int. Cl.[4] ..... C06B 31/02

[52] U.S. Cl. ..... 149/61; 149/73; 149/82

[58] Field of Search ..... 149/61, 71–73, 149/82

[56] References Cited

U.S. PATENT DOCUMENTS

| | | | |
|---|---|---|---|
| 3,910,805 | 10/1975 | Catanzarite | 149/83 |
| 4,018,635 | 4/1977 | Ryan et al. | 149/21 |
| 4,078,954 | 3/1978 | Bernardy | 149/116 |
| 4,128,443 | 12/1978 | Pawlak et al. | 149/82 |
| 4,181,545 | 1/1980 | Anderson | 149/19.9 |
| 4,225,368 | 9/1980 | Couture | 149/19.9 |
| 4,362,584 | 12/1982 | Levenson | 149/71 |
| 4,497,676 | 2/1985 | Kurtz | 149/61 |

*Primary Examiner*—Edward A. Miller
*Attorney, Agent, or Firm*—Anthony T. Lane; Robert P. Gibson; Edward F. Costigan

[57] ABSTRACT

The instant invention relates to a black powder type pyrotechnic composition comprising potassium nitrate, sulfur and an organic crystalline compound as a fuel in place of the charcoal conventionally employed. The organic compound contains at least one hydroxyl group or carboxyl group, including salts thereof, attached to an aromatic, e.g. benzene ring, and contains 75 (±20) percent carbon, 25 (±20) percent oxygen, 5 (±5) percent hydrogen and up to 20 percent of other elements, on a weight percent basis.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ORGANIC SUBSTITUTES FOR CHARCOAL IN BLACK POWDER

The invention described herein may be manufactured, used and licensed by or for the Government for governmental purposes without the payment to us of any royalities thereon.

BACKGROUND OF THE INVENTION

1. Technical Field

This application relates to a black powder type pyrotechnic having reproducible and uniform properties and more particularly to a pyrotechnic which employs a crystalline organic substrate as a substitute for charcoal.

2 . Description of the Prior Art

Devices in accordance with the prior art in the past have been known to exhibit certain shortcomings and problems. Among the prior art problems is that although the manufacture of black powder has evolved over the years, the factors that control black powders' burning properties are not fully known and certainly not undersood. Reliability and consistency of properties have been a continuing problem.

Black powder is a mixture of approximately 75 percent potassium nitrate, 15 percent charcoal and 10 percent sulfur. It is probably the oldest known energetic material and has been used in weaponry for centuries. The inconsistency between black powder's use for so many years and the lack of knowledge about the factors that control its combustion properties is related to the nature of its composition. It is a heterogeneous mixture of three solids, pressed to about 95 percent theoretical maximum density. To add to the problem, charcoal is a naturally derived substance which contains up to 35-percent tar-like constituents (volatiles) which varies from one source to another. Such variance has been found to have a great impact on the combustion properties of black powder. Recently, poor combustion properties have been cited as a cause for weapon malfunctions. One problem of prime concern is that various lots of black powder made by a particular manufacturer and black powder made by various manufacturers, using apparently equivalent processes, produce a pyrotechnic with different combustion characteristics. In fact, it has been impossible to identify "good" and "bad" lots, in relation to device performance, without a clear understanding as to the particular differences involved. Such variances are believed to be due to the nonstandard chemical and physical properties of black powder itself. The problem is made more complex by charcoal's resistance to yield structural information by standard laboratory analyses.

The reasons for the difficulties in characterizing charcoal used in black powder are many. It is an amorphous substance; it reacts and changes on heating; it is a mixture of many components; and only small portions of it will dissolve in solvents. Since the material cannot be characterized, it has been impossible to learn what reactions might be important in combustion. An object of the present invention is to provide a single organic compound which can serve as an adequate substitute for charcoal and render the same performance, in a reproducible manner, as does "good" black powder. A further object of the invention is to provide a new type of pyrotechnic material in which a standard chemistry of combustion and uniform physical properties can be maintained.

SUMMARY OF THE INVENTION

It has now been found that the problems encountered with prior art systems can be overcome through the use, in place of charcoal, of a crystalline organic compound as fuel. Thus, the major source of ambiguity in the manufacture of black powder is removed, permitting the manufacture of a black powder from standard, easily characterizable and purifiable materials.

In accordance with the present invention there is provided a pyrotechnic composition comprising potassium nitrate and an organic fuel substrate consisting essentially of a crystalline organic compound containing at least one aromatic hydroxyl or carboxyl group.

DESCRIPTION OF THE INVENTION INCLUDING THE BEST MODE

An organic crystalline compound that can be used as a substitute for charcoal in black powder in accordance with the present invention has the following characteristics:

a. It is preferably finely ground or powdered;

b. It preferably has a melting point in excess of 200 degrees C.

c. It contains one or more hydroxyl groups or carboxylic acid groups including salts thereof, attached to an aromatic, e.g., benzene ring.

d. It contains 75 (±20) percent carbon, 25 (±20) percent oxygen, 5 (±5) percent hydrogen and up to 20 percent of other elements, on a weight percent basis.

Suitable normally crystalline organic compounds include phenols containing one hydroxyl group as well as polyphenols containing two or more hydroxyl groups, and aromatic mono- and polycarboxylic acids. Besides carbon, hydrogen and oxygen, the organic compound may contain other elements, notably sulfur and nitrogen, as well as metals in the form of metal salts of such phenols and acids. Preferred organic compounds include fluorescein, phenolphthalein, 1,5-naphthalenediol, phenolphthalin, anthraflavic acid, terephthalic acid, their alkali metal salts and mixtures thereof. Additional compounds are quinalizarin, quinizarin, leucoquinizarin, hydroquinone, catechol, their salts and mixtures thereof.

The system of the instant invention provides among its advantages, extreme ease of manufacture, reliability and low cost.

The following examples illustrate the invention.

EXPERIMENTAL STANDARDS

Characterization of the pyrotechnic mixture was done by Differential Scanning Calorimetry (DSC), and combustion rate measurements of pressed sticks were conducted at one atmosphere.

PREPARATION OF PYROTECHNIC MIXTURES

The pyrotechnic powders were made by grinding a mixture consisting of 75 parts of potassium nitrate, 10 parts of sulfur and 15 parts of a crystalline organic fuel (by weight) in a mortar and pestle until they passed through a 120-mesh screen. The selected proportions are those used in black powder. The mixtures were compared to charcoal-black powder which was prepared in the same manner and used as a control in these experiments.

STRAND BURNING EXPERIMENTS

The pyrotechnic material was formed into a rectangular parallelpiped by pressing a weighed sample (0.8 g) in a constant volume die where a spacer limited piston travel and controlled dimensions. Internal free volume was kept small; e.g. free volume in the fluorescein sample was approximately 5.1 percent.

The samples were burned at one atmosphere and combustion was recorded on video tape or movie film. Burning times were measured by counting picture frames (see table II).

THERMAL ANALYSIS

All Differential Scanning Calorimetry was done on a Dupont 990 Thermal Analyzer. Samples were run as follows:

Approximately 10 mg of loose pyrotechnic powder was placed in an aluminum sample pan which was covered with a perforated aluminum lid. This sample pan was placed in the DSC, carefully flushed with argon and then heated at a rate of 20 degrees C/min. from ambient to 500 degrees C.

RESULTS AND DISCUSSION

TABLE I

Organic Fuels Used in Pyrotechnic Powders

| COMPOUND | STRUCTURAL FORMULAS | M.P. °C. | % C | % H | % O | Other Elements |
|---|---|---|---|---|---|---|
| Polynuclear Aromatic Compounds | | | | | | |
| Anthracene | 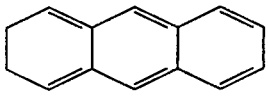 | 218 | 94.31 | 5.66 | — | — |
| Tetracene | 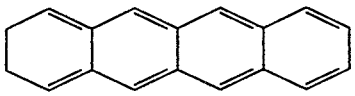 | 300 | 94.70 | 5.30 | — | — |
| p-Quaterphenyl | 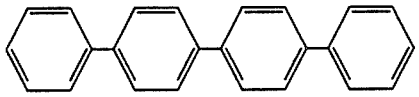 | 300 | 94.10 | 5.90 | — | — |
| Rubrene | 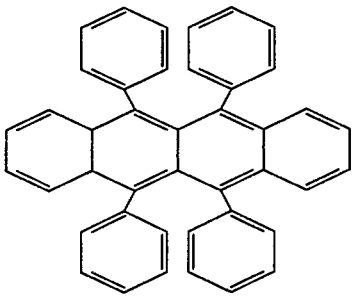 | 315 | 94.71 | 5.29 | — | — |
| Compounds Containing Hydroquinone and Catechol moieties | | | | | | |
| Catechol | 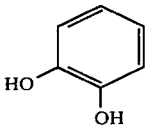  | 104 | 65.44 | 5.49 | 29.06 | — |
| Hydroquinone | 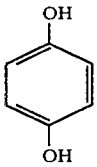  | 170 | 65.44 | 5.49 | 29.06 | — |
| Quinizarin | 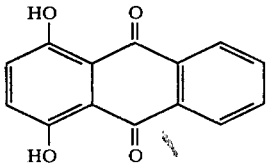  | 200 | 70.00 | 3.36 | 26.64 | — |

TABLE I-continued
Organic Fuels Used in Pyrotechnic Powders
| COMPOUND | STRUCTURAL FORMULAS | M.P. °C. | % C | % H | % O | Other Elements |
|---|---|---|---|---|---|---|
| Leucoquinizarin | 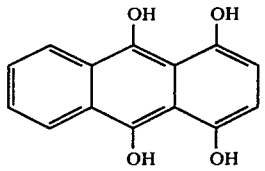 | 146 | 69.41 | 4.16 | 26.42 | — |
| Quinalizarin | 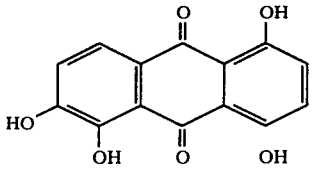 | 305 | 61.77 | 2.96 | 35.27 | — |
| Other phenoxy Compounds | | | | | | |
| Anthraflavic Acid | 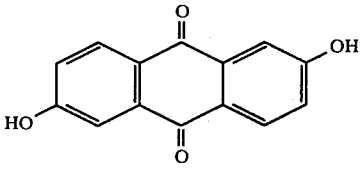 | 360 | 70.00 | 3.36 | 26.64 | — |
| Phenolphthalein | 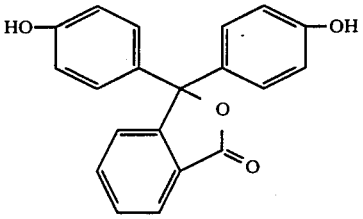 | 258 | 75.46 | 4.43 | 20.10 | — |
| Fluorescein | 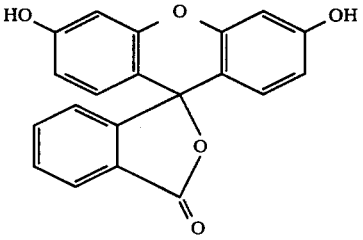 | 314 | 72.28 | 3.64 | 24.07 | — |
| Phenolphthalin | 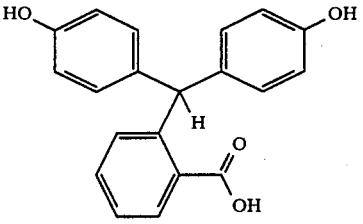 | 237 | 74.99 | 5.04 | 19.98 | — |
| Other Compounds | | | | | | |
| Phenolphthalein Disodium Salt | 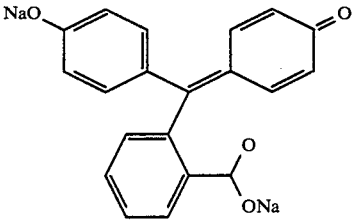 | — | 66.30 | 3.34 | 17.67 | Na,12.70 |

TABLE I-continued

Organic Fuels Used in Pyrotechnic Powders

| COMPOUND | STRUCTURAL FORMULAS | M.P. °C. | % C | % H | % O | Other Elements |
|---|---|---|---|---|---|---|
| Fluorescein Disodium Salt | 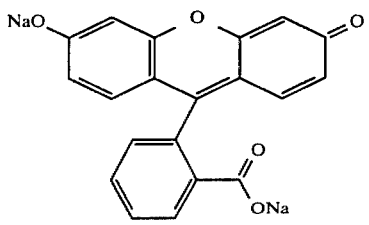 | — | 63.84 | 2.68 | 21.26 | Na,12.22 |
| Terephthalic Acid | 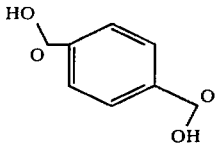 | 300 | 57.83 | 3.64 | 38.52 | — |
| Anthraquinone | 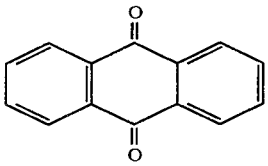 | 286 | 80.76 | 3.87 | 15.37 | — |

TABLE II

Strand Burning Rates of Pyrotechnic Formulations at One Atmosphere

| Formulations (Weight Percent) $KNO_3$ | S | Organic | | Burn Rate cm/sec |
|---|---|---|---|---|
| Charcoal black powder control | | | | |
| 75 | 10 | 15 | (Maple Charcoal) | 0.58 |
| Polynuclear Aromatics | | | | |
| 75 | 10 | 15 | (Anthracene) | 0 |
| 75 | 10 | 15 | (Tetracene) | 0 |
| 75 | 10 | 15 | (p-Quaterphenyl) | 0 |
| 75 | 10 | 15 | (Rubrene) | 0 |
| 75 | 10 | 15 | (Graphite) | 0 |
| Compounds Containing Hydroquinone and Catechol Moieties | | | | |
| 75 | 10 | 15 | (Hydroquinone) | 0.13 |
| 75 | 10 | 15 | (Catechol) | slow |
| 75 | 10 | 15 | (Quinizarin) | 0.08 |
| 75 | 10 | 15 | (Leucoquinizarin) | 0.05 |
| 75 | 10 | 15 | (Quinalizarin) | 0.15 |
| Other Phenolic Compounds | | | | |
| 75 | 10 | 15 | (Anthraflavic Acid) | 0.44 |
| 75 | 10 | 15 | (Phenolphthalein) | 0.93 |
| 75 | 10 | 15 | (Fluorescein) | 0.62 |
| 75 | 10 | 15 | (Phenolphthalin) | 0.53 |
| Other Compounds | | | | |
| 75 | 10 | 15 | (Phenolphthalein Disodium Salt) | 0.44 |
| 75 | 10 | 15 | (Fluorescein Disodium Salt) | 0.41 |
| 75 | 10 | 15 | (Terephthalic Acid) | 0.23 |
| Sulfurless Powders | | | | |
| 75 | — | 25 | (Quinizarin) | 0.53 |
| 75 | — | 25 | (Anthraflavic Acid) | 0.64 |

The results show that polynuclear aromatic hydrocarbons, which do not contain any type of oxygen functionality, do not sustain combustion of the pyrotechnic mixture. The polyphenols, terephthalic acid mixture and phthalein salts all produced pyrotechnic mixtures which sustained combustion and some even burned faster than charcoal-black powder. The phenolics which contained catechol/hydroquinone moieties (good organic reducing agents) were less reactive than other phenolics. This has been attributed to a deactivating reaction between sulfur and the catechol/hydroquinone moiety.

The results also show that fluorescein can be successfully substituted for maple charcoal in black powder. It is remarkable that the fluorescein-containing mixture has essentially the same burn rate as did the maple charcoal containing mixture. When phenolphthalein was used in place of the charcoal, the mixture burned even faster. When quinalizarin was used in place of charcoal, the mixture burned at approximately one fourth the rate of black powder made from maple charcoal.

The hydroquinone/catechol type compounds are capable of undergoing a two-electron oxidation (quinalizarin, quinizarin, leucoquinizarin, hydroquinone and catechol); while other phenolics tested are not (anthraflavic acid, fluorescein, phenolphthalein and phenopthalin).

When these materials were incorporated into pyrotechnic powders and burned in pressed stick form, all the compounds which easily undergo a two-electron oxidation burned but they burned quite slowly. On the other hand, the polyphenolic compounds, which could not undergo this hydroquinone to quinone type oxidation, burned very rapidly. In fact the latter group burned faster than the charcoal-black powder control (see Table II). The most striking example of this is the comparison of the anthraflavic acid and quinizarin pyrotechnic powders. These two compounds are structural isomers; quinizarin is 1,4-dihydroxyanthraquinone and anthraflavic acid is 2,6-dihydroxyanthraquinone. The former compound burned at only 0.08 cm/sec while the latter burned at 0.44 cm/sec.

The DSC's of the pyrotechnic powders containing organic compounds with catechol or hydroquinone moieties looked similar to those of charcoal-black powder. With black powder, there is a double-peaked exotherm associated with the melting point of the potassium nitrate. This peak has been labeled the preignition exotherm and has been attributed to a reaction involving all three components in black powder. In the compositions containing catechol or hydroquinone moieties, this peak is present and the magnitude of the reaction is similar to that observed in black powder. The next peak in the DSC's of these material has been labeled the "ignition" exotherm because it is this second exotherm that the greatest amount of heat is released. In black powder this peak is very strong and occurs at about 425 degrees C.

In the catechol/hydroquinone powders, the "ignition" peak is reduced in magnitude and/or it is moved to temperatures in excess of 450 degrees C. It appears, then that these easily-oxidized systems are oxidized to material that are much less reactive toward subsequent oxidation. This supposition is supported by the inability of an anthraquinone pyrotechnic powder to sustain combustion. (Anthraquinone is the oxidized form of a hydroquinone, dihydroanthraquinone.)

Interestingly, polyphenolic materials which cannot undergo an easy two-electron oxidation, such as the anthraflavic acid and the phthaleins, showed little or no exothermic reaction on the melting of potassium nitrate; the only reaction observed by the DSC was the "ignition" exotherm at about 425 degrees C. It is noted that these materials all burned well in their pyrotechnic mixtures.

The pre-ignition reaction between potassium nitrate, sulfur, and charcoal occurs in several steps with the first step being a nonexothermic reduction of sulfur by the organic charcoal. This is followed by the exothermic reaction between the potassium nitrate and the "reduced" sulfur. It is possible that the species that oxidizes the catechol/hydroquinone moieties to some nonreactive compound is the sulfur and not the potassium nitrate. Sulfurless powders were made with quinizarin (which contains a hydroquinone moiety) and anthraflavic acid (which does not contain hydroquinone moiety). Both of these powders burned very rapidly, at a rate of about 0.5 to 0.6 cm/sec. For quinizarin this an increase in rate by a factor of 5 and for anthraflavic acid, the burning rates of sulfur less and sulfur containing mixture are about equal, 0.64 to 0.44 cm/sec. It appears that sulfur is the reactant which turns the hydroquinone/catechol moieties into a less reactive species.

What is claimed is:

1. In a solid pyrotechnic composition containing:
A. about 75 weight percent potassium nitrate,
B. about 10 weight percent elemental sulfur, the improvement consisting essentially of:
C. about 15 weight percent of an organic crystalline compound selected from the group consisting of:
1. fluorescein,
2. phenolphthalein,
3. 1,5 naphthalenediol,
4. anthraflavic acid,
5. terephthalic acid,
6. phenolphthalin,
7. the alkali metal salts of 1 to 6, and
8. mixtures of 1 to 6.

2. In a solid pyrotechnic composition containing:
A. about 75 weight percent potassium nitrate,
B. about 10 weight percent elemental sulfur, the improvement consisting essentially of:
C. about 15 weight percent of an organic crystalline compound selected from the group consisting of:
1. quinalizarin,
2. quinizarin,
3. leucoquinizarin,
4. hydroquinone,
5. catechol,
6. the alkali metal salts of 1 to 5, and
7. mixtures of 1 to 6.

* * * * *